(12) United States Patent
Beyerle

(10) Patent No.: US 7,498,964 B1
(45) Date of Patent: Mar. 3, 2009

(54) ANALOG INTERFACE FOR DIGITAL INSTRUMENTATION

(76) Inventor: Albert G Beyerle, Mirmar Sensors, LLC, 5959 Hollister Suite C, Goleta, CA (US) 93117

(*) Notice: Subject to any disclaimer, the term of this patent is extended or adjusted under 35 U.S.C. 154(b) by 0 days.

(21) Appl. No.: 11/611,884

(22) Filed: Dec. 17, 2006

Related U.S. Application Data

(60) Provisional application No. 60/597,843, filed on Dec. 21, 2005.

(51) Int. Cl.
*H03M 1/00* (2006.01)
(52) U.S. Cl. .................. 341/132; 341/108; 341/110; 375/206; 375/253; 375/282; 375/283; 375/288; 250/253; 250/281; 250/288
(58) Field of Classification Search .......... 341/108, 341/110, 114, 120, 132; 250/253, 288, 206, 250/208.2, 282, 283, 551; 375/222, 522, 375/506, 220, 354
See application file for complete search history.

(56) References Cited

U.S. PATENT DOCUMENTS

| | | | | |
|---|---|---|---|---|
| 5,608,222 A | * | 3/1997 | Hardy, II | .................. 250/369 |
| 5,807,051 A | * | 9/1998 | Heminger | .................. 411/82 |
| 5,872,363 A | * | 2/1999 | Bingham et al. | ........ 250/363.01 |
| 6,411,098 B1 | * | 6/2002 | Laletin | .................. 324/436 |
| 6,480,533 B1 | * | 11/2002 | Chu et al. | .................. 375/222 |
| 6,522,984 B1 | * | 2/2003 | Jordanov | .................. 702/107 |
| 6,816,102 B2 | * | 11/2004 | Pavicic | .................. 341/155 |
| 7,123,176 B1 | * | 10/2006 | Jordanov | .................. 341/132 |
| 7,239,905 B2 | * | 7/2007 | Kiani-Azarbayjany et al. | ... 600/316 |
| 7,247,855 B2 | * | 7/2007 | Castellane et al. | ..... 250/363.01 |
| 2007/0114443 A1 | * | 5/2007 | Baltz et al. | ............... 250/458.1 |

* cited by examiner

*Primary Examiner*—Linh V Nguyen
(74) *Attorney, Agent, or Firm*—Felix L. Fischer

(57) ABSTRACT

Nuclear spectroscopy systems have improved over the course of time especially with the advent of digital pulse processing. One disadvantage of digital processing, however, is that it has eliminated the older, universally compatible interface standard of analog signals. Digital component interfaces are often defined by computer software, protected by copyright and unique to a single manufacturer. Consequently, all components of an entire spectroscopy system must be from a single manufacturer. This not only dictates system wide component replacement, but also impedes optimization that would otherwise occur were component compatibility the rule rather than the exception. The present innovation describes a method and apparatus to relieve the present incompatibility between digital components of a nuclear spectroscopy system that are supplied by more than one manufacturer.

3 Claims, 4 Drawing Sheets

ANALOG INTERFACE FOR DIGITAL INSTRUMENTATION

The present invention relates to signal processing instrumentation and techniques as applied to nuclear spectroscopy systems.

BACKGROUND AND PRIOR ART

Nuclear spectroscopy systems have enjoyed significant improvements over the past few years due, in part, to a widespread trend away from older analog signal processing in favor of the newer digital pulse processing methods. Although this migration has enabled a wider scope of capability, it lacks the universality of the older analog methods and makes it difficult, if not altogether impossible, for different components of a spectroscopy system to interface. Unlike their older analog counterparts, digital processing components made by a first manufacturer are usually unable to interface with digital processing components made by a different manufacturer. This confines the user to a system having components from only one manufacturer, thereby restricting the generality of use for each component and preventing a full optimization of the system. Moreover, older analog legacy components integral to many systems are rendered obsolete when any part of the system is replaced with a digital interface, requiring most or all of the system to be replaced.

Particularly in academic situations, a spectroscopy system is often a collection of components that are new, old, and/or simply available given the constraints of legacy instrumentation and funding. Consequently, such incompatibility is indeed a serious limitation, often presenting financial barriers that are simply insurmountable. Clearly, a solution is needed.

The present disclosure addresses this issue by describing a universal adaptation system capable of bridging the communication gap between analog and digital components made by different manufacturers.

SUMMARY

A method for creating interface compatibility between digital components of a nuclear spectroscopy system is disclosed. A nuclear spectroscopy system is presented, wherein the nuclear spectroscopy system has a plurality of components defining a signal processing flow. The signal processing flow is mapped and incompatible component interfaces are identified. Such incompatibilities are relieved by interposing a digital signal processor followed by a digital to amplitude converter within the incompatible component interface.

The method further comprises presenting a first digital component of the incompatible component interface. The first digital component is the product of a first manufacturer, has a first digital output, and a first communication protocol. A second digital component of the incompatible component interface is presented, wherein the second digital component is the product of a second manufacturer. The second digital component anticipates a second digital input that is characterized by a second communication protocol. The second communication protocol is incompatible with the first communication protocol. A digital signal processor and a digital to amplitude converter are interposed between the first digital component and the second digital component. The digital signal processor is capable of receiving the first digital output from the first digital component and has an output responsive thereto. The output of the digital signal processor is capable of being received by the digital to amplitude converter. The digital to amplitude converter produces an analog signal in response to the output of the digital signal processor. The analog is capable of being received by the second digital component. Thus, interface compatibility is created at the incompatible component interface.

DESCRIPTION OF THE PREFERRED EMBODIMENTS

The term "analog data", as used herein, is descriptive of a continuous pulse, wherein the pulse level at any given point represents the voltage level of an electrical signal. Analog data is indicated in the drawings by a single arrow.

The term "digital data", as used herein, is descriptive of a list of numbers representing the voltage level of an electrical signal at regularly spaced time intervals. Unlike analog data, digital data is not continuous. Digital data is indicated in the drawings by a group of seven parallel arrows.

DESCRIPTION OF NUMERALS USED IN THE FIGS.

10—detector and its processing electronics
11—preamplifier
12—shaping filter amplifier
13—digitizer
14—histogram unit
15—computer
16—preamp pulse
17—gaussian pulse
20—digital pulse processing unit
21—section of pulse processing system that must be common to only one manufacturer
30—Digital to Analog Converter (DAC)

DESCRIPTION OF THE PREFERRED EMBODIMENTS

Figure 1:
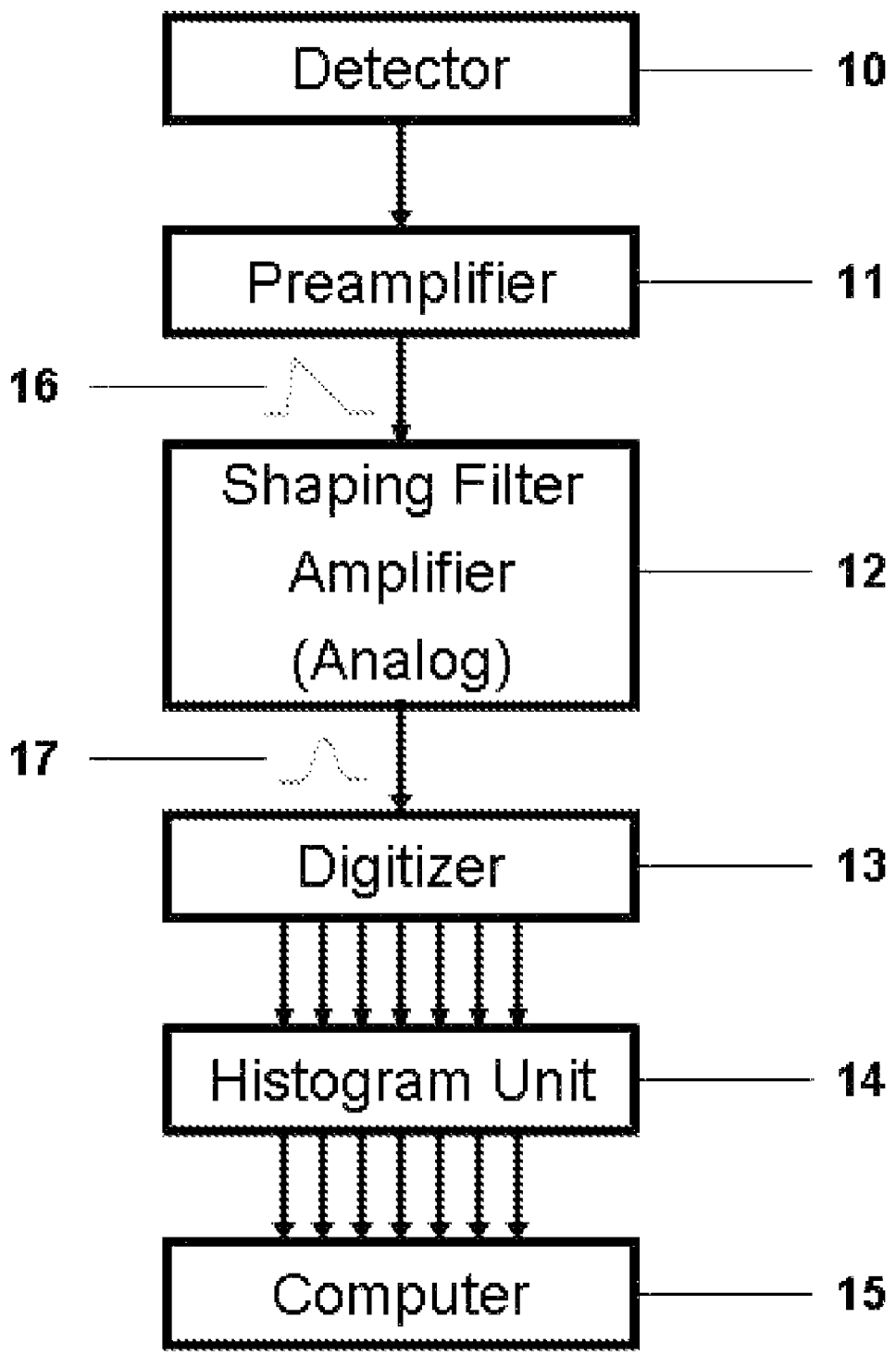
FIG. 1 shows a conceptual schematic of a traditional analog system.

FIG. 1 shows a conceptual schematic of a typical traditional analog nuclear spectroscopy system. The detector (10) and its associated electronics, detects and outputs an electrical pulse, the shape of which contains information about the physical quantity of interest. The output of the detector (10) subsequently becomes the input to a preamplifier (11), an analog pulse having the general shape shown in item (16). These first two steps are common both to the traditional spectroscopy system of FIG. 1, as well as the more modern digital spectroscopy system, shown in FIG. 2. However, the two types of systems diverge beyond these initial steps.

The analog systems of FIG. 1 subsequently employs a shaping filter amplifier (12). The output to the shaping filter amplifier (12) is an analog signal, generally of gaussian shape as shown at (17). This output signal is then digitized by the digitizer (13).

Figure 2:
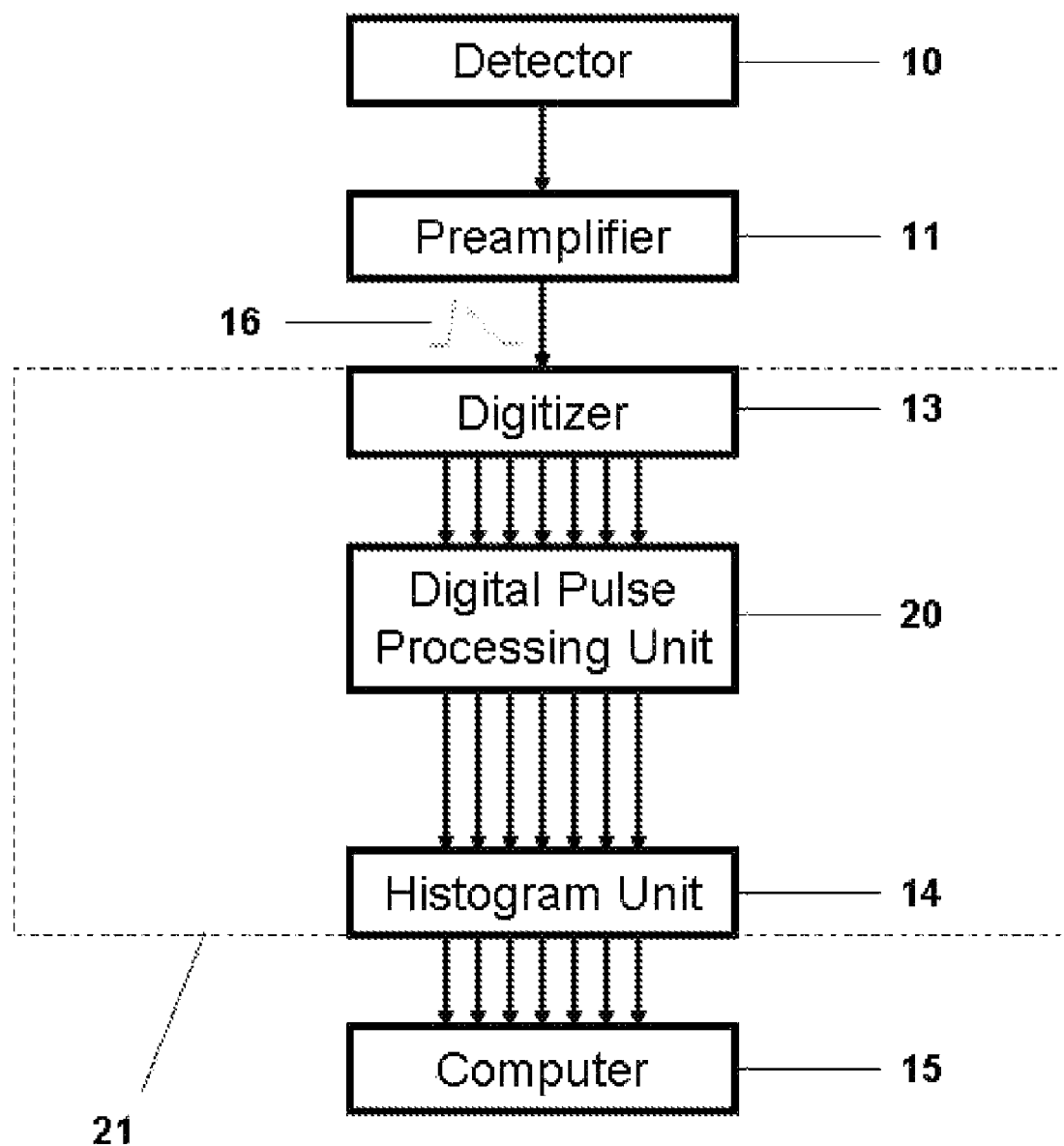
FIG. 2 illustrates a more modern digital system.

The newer digital systems of FIG. 2 perform similar functions in reverse order. The preamplifier (12) output is immediately digitized by the digitizer (13) which is subsequently processed by a digital pulse processing unit (20). The latter essentially plays the same role as the shaping filter amplifier

(12) of the analog systems, except that it inputs and outputs a digital signal as opposed to an analog signal.

The remainder of the work flow process is substantially the same after the pulse leaves either the digitizer (13) in the analog system of FIG. 1, or after it leaves the digital pulse processing unit (20) of the digital system shown in FIG. 2. However, one extremely important distinction between the old and new systems still exists. Unlike as in older analog systems, components of the newer digital systems must be manufactured by the same entity as indicated by the dotted boxed area (21). Data communication issues such as bit rates, header information, data structures, etc. are not determined by an industry standard but are subject to particular choices made by each manufacturer. In the absence of industry standards, each manufacturer has chosen to address such issues differently. Consequently, a second digital component from a second manufacturer is unable to anticipate critical communication protocol when receiving a signal from a first digital component from a first manufacturer. Moreover, such protocol is often protected copyrighted by their respective manufacturers, thus explicitly eliminating shared protocol between different manufacturing entities.

Such restriction to only one manufacturer has serious ramifications. It not only precludes the system optimization that is enjoyed by analog systems wherein components of differing suppliers can communicate freely, but also impedes the "natural" component-by-component update of older systems that would otherwise occur. In order to take advantage of newer digital pulse processing capabilities, an entire system must be replaced at once, as opposed to one component at a time. The funds necessary to perform whole system replacement present an obstacle that is difficult, if not altogether impossible, for small research groups to shoulder.

Figure 3:
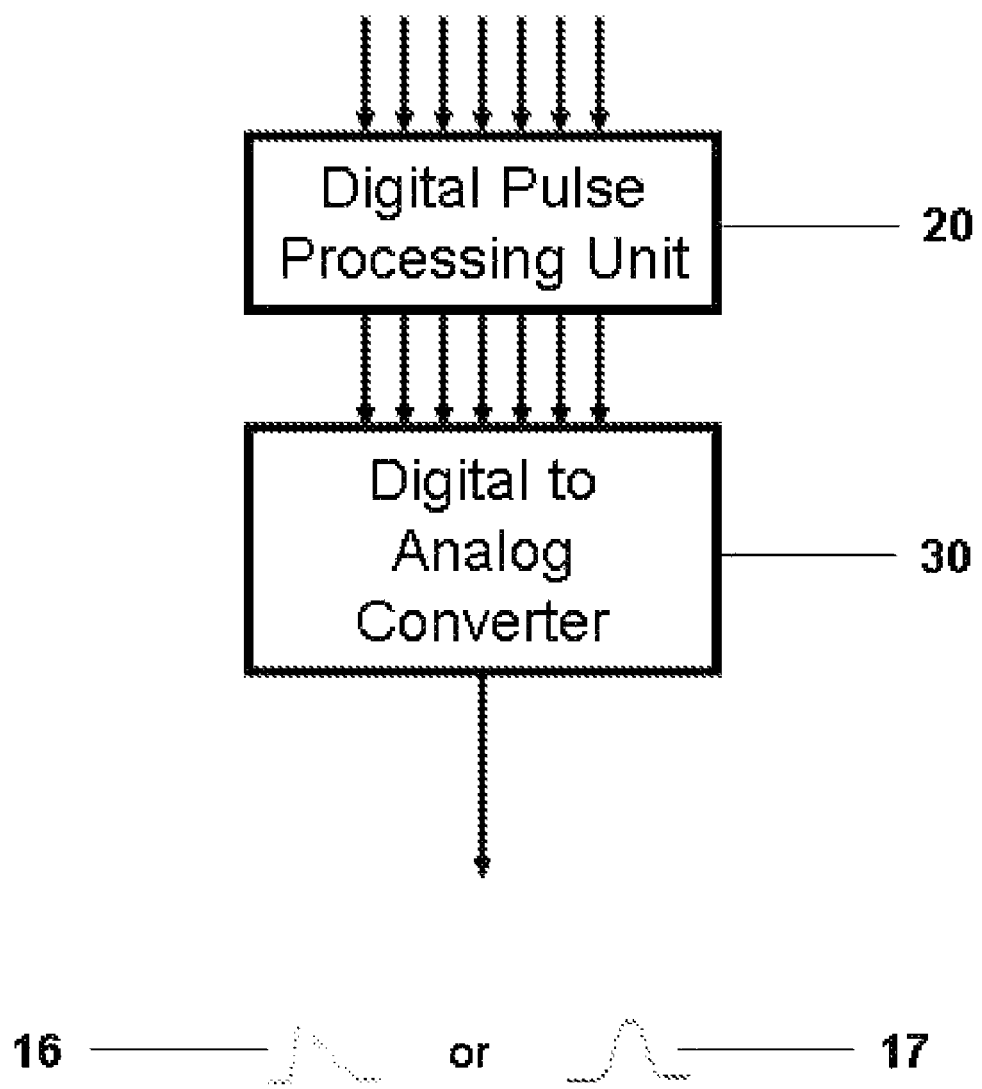
FIG. 3 indicates the process of simulating an analog signal.
Figure 4:
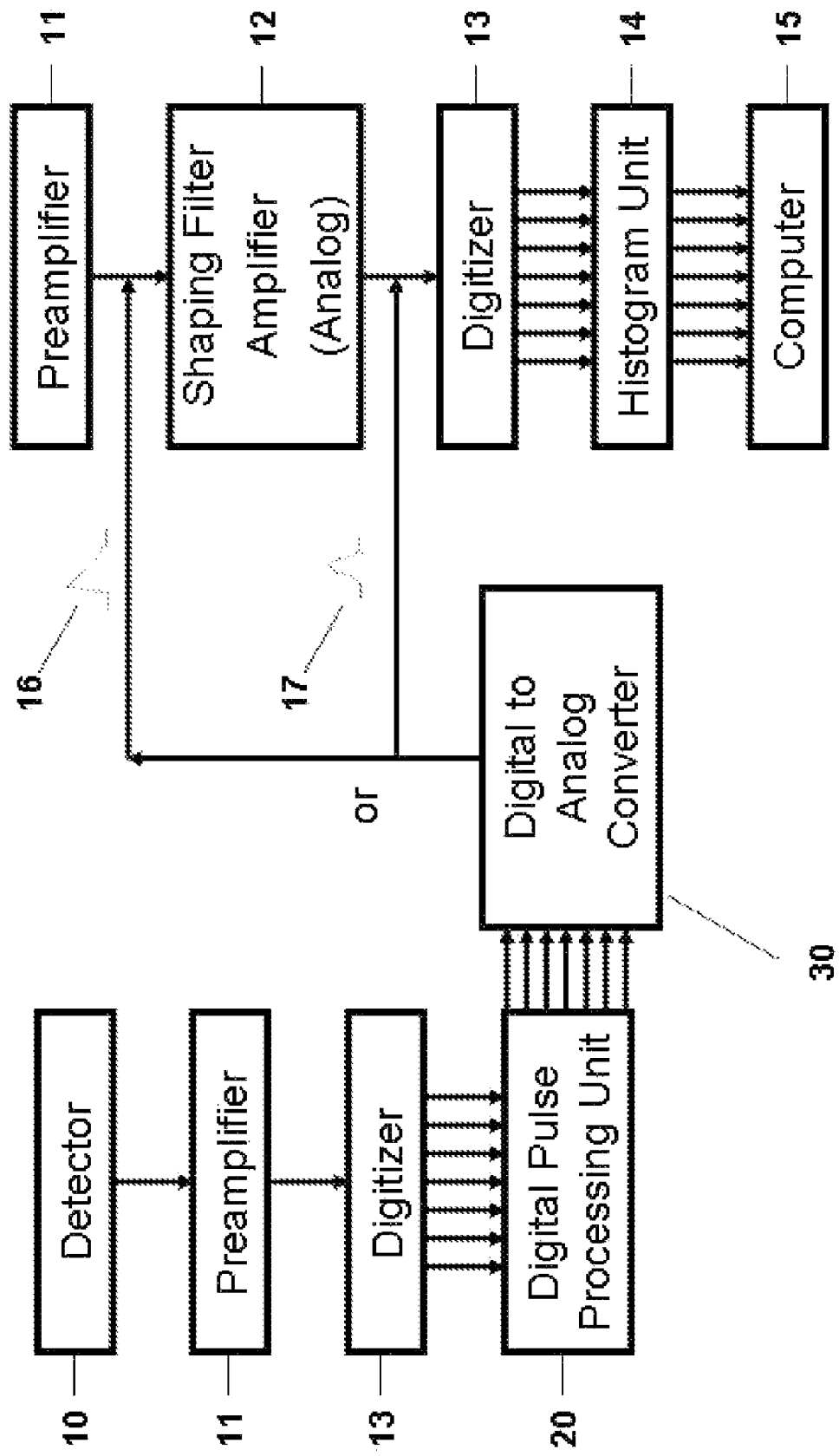
FIG. 4 shows a nuclear spectroscopy system using the simulation procedure of the present invention.

The present innovation addresses this problem by exploiting the fact that every digital component accepts analog input. Thus a digital signal can be intercepted at any point in the process of FIG. 2, converted to an analog signal, and then re-introduced into the system. This idea is shown diagrammatically in FIG. 3 wherein a digital signal is routed through a digital to analog converter (30) before being returned to the system, generally as an analog Gaussian (17) or preamp pulse (16). FIG. 4 indicates how this procedure might be incorporated in a nuclear spectroscopy system, although such a signal interception can occur anywhere within the process flow of FIG. 2. Moreover, its implementation is significantly more economical than the alternative total system replacement.

More sophisticated pulse-processing techniques enabled by digital processing are beginning to emerge. This innovation allows benefit to be derived from the implementation of any digital technique, yet relieves the present restrictions presently suffered by incorporation into pre-existing legacy systems.

The invention claimed is:

1. A method for creating interface compatibility between digital components of a nuclear spectroscopy system comprising:
   a. presenting a nuclear spectroscopy system, wherein said nuclear spectroscopy system comprises a plurality of components, wherein said plurality of components defines a signal processing flow,
   b. mapping said signal processing flow,
   c. identifying an analog signal component interface between two of said plurality of components with incompatible digital data communication protocol that interrupts said signal processing flow,
   d. interposing a digital signal processor followed by a digital to amplitude converter within said incompatible component interface, whereby interface compatibility is created at said incompatible component interface.

2. A method for creating interface compatibility between digital components of a nuclear spectroscopy system comprising:
   a. presenting a nuclear spectroscopy system, wherein said nuclear spectroscopy system comprises a plurality of components, wherein said plurality of components defines a signal processing flow,
   b. mapping said signal processing flow,
   c. identifying an incompatible component interface that interrupts said signal processing flow,
   d. presenting a first digital component of said incompatible component interface, wherein said first digital component is the product of a first manufacturer, wherein said first digital component has a first digital output, and wherein said first digital output has a first communication protocol,
   e. presenting a second digital component of said incompatible component interface, wherein said second digital component is the product of a second manufacturer, wherein said second digital component anticipates a second digital input, wherein said second digital input is characterized by a second communication protocol, and wherein said second communication protocol is incompatible with said first communication protocol, and
   f. interposing a digital signal processor and a digital to amplitude converter within said incompatible component interface between said first digital component and said second digital component, wherein said digital signal processor is capable of receiving said first digital output from said first digital component, wherein said digital signal processor has an output responsive to said first digital output of said first digital component, wherein said output of said digital signal processor is capable of being received by said digital to amplitude converter, wherein said digital to amplitude converter produces an analog signal in response to said output of said digital signal processor, wherein said analog signal is capable of being received by said second digital component, whereby interface compatibility is created at said incompatible component interface.

3. A method for creating interface compatibility between incompatible digital components of a nuclear spectroscopy system comprising:
   a. presenting a nuclear spectroscopy system, wherein said nuclear spectroscopy system comprises a plurality of components,
   b. presenting a first digital component of said nuclear spectroscopy system, wherein said first digital component is the product of a first manufacturer, wherein said first digital component has a first digital output, and wherein said first digital output has a first communication protocol,
   c. presenting a second digital component of said nuclear spectroscopy system, wherein said second digital component is the product of a second manufacturer, wherein said second digital component anticipates a second digital input, wherein said second digital input is characterized by a second communication protocol, and wherein said second communication protocol is incompatible with said first communication protocol, and
   d. interposing a digital signal processor and a digital to amplitude converter between said first digital component and said second digital component, wherein said digital signal processor is capable of receiving said first digital output from said first digital component, wherein said digital signal processor has an output responsive to said first digital output of said first digital component, wherein said output of said digital signal processor is capable of being received by said digital to amplitude converter, wherein said digital to amplitude converter produces an analog signal in response to said output of said digital signal processor, and wherein said analog signal is capable of being received by said second digital component, whereby interface compatibility is created at said incompatible component interface.

* * * * *